United States Patent [19]

King et al.

[11] 4,146,329
[45] Mar. 27, 1979

[54] AUTOALIGNMENT SYSTEM FOR HIGH POWER LASER

[75] Inventors: Robert E. King, Rancho Palos Verdes; Donald C. Winter, Manhattan Beach, both of Calif.

[73] Assignee: The United States of America as represented by the Secretary of the Navy, Washington, D.C.

[21] Appl. No.: 833,217

[22] Filed: Sep. 14, 1977

[51] Int. Cl.² ............................................. G01B 11/26
[52] U.S. Cl. ............................... 356/152; 331/94.5 C; 331/94.5 T; 356/153
[58] Field of Search ............................. 356/152, 153; 331/94.5 C, 94.5 T; 219/121 L, 121 LM

[56] References Cited

U.S. PATENT DOCUMENTS

| | | | |
|---|---|---|---|
| 3,497,697 | 2/1970 | Brinkman et al. | 356/152 |
| 3,902,036 | 8/1975 | Zaleckas | 219/121 L |
| 3,937,079 | 2/1976 | Chodzko | 331/94.5 C |
| 3,942,127 | 3/1976 | Fluhr et al. | 331/94.5 C |
| 3,942,894 | 3/1976 | Maier | 356/153 |

*Primary Examiner*—S. C. Buczinski
*Attorney, Agent, or Firm*—R. S. Sciascia; A. L. Branning

[57] ABSTRACT

A system for automatically aligning a high power laser. The optical train of the high power laser includes an unstable resonator cavity, a two axis, gimballed turning mirror and a extraction mirror. The autoalignment system utilizes a HeNe laser to propagate an alignment beam coaxial with, and prealigned with, the high power beam. The reference beam traverses the same optical path as the main, high power beam, propagating through all of the relay optics of the laser train. This allows angular deviations in the pointing direction of the main beam to be inferred from the angularity of the reference beam. At the downstream end of the laser train, the extraction mirror functions as an optical interface, pointing the main beam in the preferred output direction and extracting the reference beam by means of a central passageway through the extraction mirror. The extracted reference beam is directed on a path incident to a null angle sensor. The angularity of the extracted reference beam is detected by the null angle sensor. Any angular displacement results in a corresponding error signal. The error signals are translated by alignment system servo electronics into correcting tilt adjustments to the gimballed turning mirror, realigning the main beam as well as the coaxial reference beam.

18 Claims, 2 Drawing Figures

AUTOALIGNMENT SYSTEM FOR HIGH POWER LASER

BACKGROUND OF THE INVENTION

The present invention relates to the field of autoalignment systems for high power lasers and more particularly to autoalignment systems utilizing a separate alignment laser.

In many present and potential high power laser applications, it is necessary to control the direction of output beam propagation to within a few micro radians. Even in applications involving immobile, terrestial operation in a semi laboratory environment, the requirements for micro radian accuracy involve alignment system compensation for such low frequency laser beam drifts as (a) temperature variations of mirror mounts, piers and foundations, (b) metallic "creep" of mirror mounts and optical bench structures, (c) mechanical load variations on mirrors and mirror mounts due to cooling water pressure and flow and (d) relative displacement of building floors and foundations due to variations of temperature, soil humidity and atmospheric pressure. In view of the operational time involved in manual techniques for obtaining such alignment precision, the development of systems for automatically aligning high power lasers is of current interest. The high power levels involved, however, preclude the use of straight forward optical techniques, such as beam splitting or beam sampling.

SUMMARY OF THE INVENTION

It is therefore an object of the present invention to provide an autoalignment system for a high power laser.

A further object of the present invention is to provide an autoalignment system for a high power laser which utilizes a separate HeNe laser to provide an alignment beam.

Another object of the present invention is to provide an autolignment for a high power laser system if an alignment reference beam traverses the same optical path as the high power main beam so that angular deviations in the main beam can be inferred from the angularity of the reference beam.

Still another object of the present invention is to provide an autoalignment system for a high power laser with an effective, straightforward means for extracting a reference beam from the laser train.

Yet another object of the present invention is to provide an autoalignment system for a high power laser capable of maintaining pointing direction of the high power laser beam to within micro-radian accuracy.

Accordingly, to accomplish these and other objects, the present invention provides an autoalignment system for a high power laser. The optical train of the high power laser includes an unstable resonator cavity which generates a high power, annular shaped, main laser beam; a two axis, gimballed turning mirror; and an extraction mirror. The autoalignment system utilizes a separate HeNe laser to propagate an alignment reference beam which is introduced into the optical train of the main laser at the resonator cavity. The reference beam is directed to be coaxial with and prealigned with the annular main laser beam, traversing the same optical path and propagating through all the main laser relay optics. At the downstream end of the laser train, an extraction mirror functions as an optical interface, extracting the reference beam from the main beam. The extraction mirror comprises a reflective surface and a passageway through the mirror which intersects the reflective surface in a central hole. The incident annular main laser beam is reflected from the reflective surface in the preferred output direction, while the co-axial reference beam propagates through the hole in the reflective surface and the passageway. Exiting this passageway, the reference beam is reflected by a dichroic beam splitter in a path incident to a null angle sensor. This sensor detects angular deviations in the reference beam, from which angular deviations in the main beam can be inferred, generating corresponding error signals. A servo electronics device translates null angle-sensor error signals into correlative, corrective tilt adjustments to the gimballed turning mirror. This nulls the angular deviations in the coaxial beams, establishing pointing stability for the main laser beam.

A more complete appreciation of the present invention and many of the attendant advantages thereof will be readily apparent as the same becomes better understood by reference to the following detailed description, with the appended claims, when considered in conjunction with the accompanying drawings.

DESCRIPTION OF THE PREFERRED EMBODIMENT

The laser autoalignment system according to the present invention, as hereinafter described in detail, provides means for maintaining the directional alignment of the optical train of a high power laser to within micro-radian accuracy. That is, the laser autoalignment system functions to compensate for the misalignments which occur in the elements comprising the optical train of the high-power laser. As is understood by those skilled in the laser arts, misalignments of a high-power laser apparatus can also result from misalignments in the optical elements which comprise the high-power laser cavity. Such misalignments within the high-power laser cavity are not the subject of the present invention; these misalignments can be corrected by employing an inherently mechanically stable laser cavity or by providing an alignment system for the cavity itself.

Figure 1:
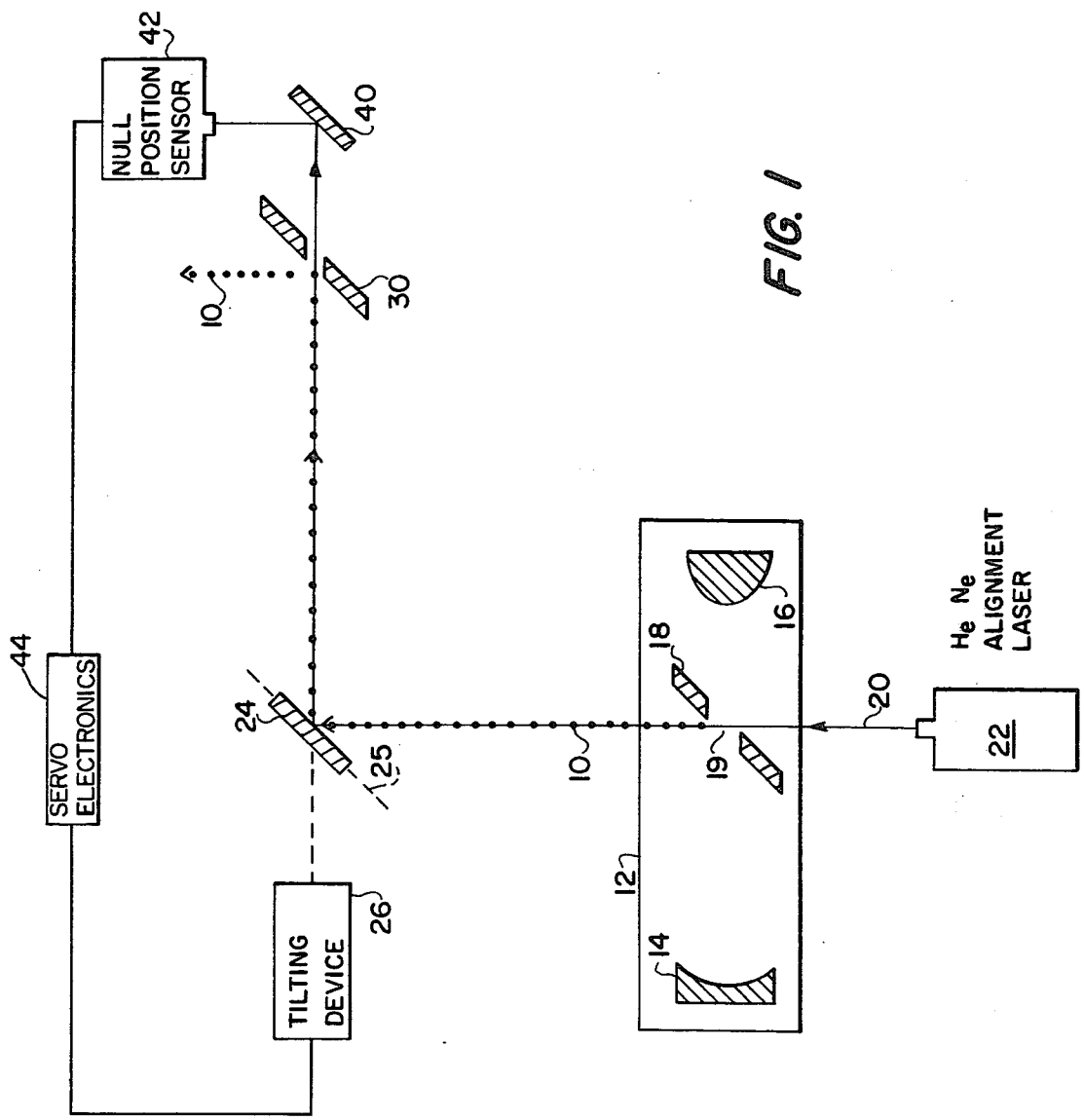
FIG. 1 is a schematic plan view of a high power laser system including an autoalignment system in accordance with the present invention.

Referring now to the drawings, wherein like reference characters designate like or corresponding elements throughout both views, a gas dynamic, chemical, or other high-power laser apparatus is represented in FIG. 1 by an unstable resonator cavity 12. Such a representation excludes, of course, the low-pressure optical boxes and the aerodynamic-window interface commonly employed in high power, lasers. In addition, none of the various relay optics commonly employed in the optical trains of high power lasers (e.g., beam shaping and beam expanding telescopes, beams shutters and clippers, calorimitry optics, etc.) are shown as they have no affect on the operation of the autoalignment system according to the present invention. Resonator cavity 12 is defined by a concave end mirror 14 and a convex end mirror 16 and includes a 45 degree "scraper" mirror 18. Scraper mirror 18 serves as a coupling mirror, extracting oscillating radiation from the resonator path and coupling it out of the cavity. Scraper mirror 18 consists essentially of a flat mirror with a hole 19 centered on the optical axis of resonator cavity 12. Radiation oscillates between concave and convex end mirrors 14 and 16, expanding out from the optical axis of the cavity until it spills over central hole 19. This spill-over radiation is "scraped" by scraper mirror 18, extracting a high-power laser beam 10 (dotted line) from resonator cavity 12. This method of coupling high power laser beam 10 out of the resonator cavity results in an annular beam of radiation having an obscured central region.

To perform the task of aligning high power beam 10, the autoalignment system according to the present invention utilizes an external, HeNe laser to propagate an alignment beam. HeNe laser 22 is prealigned to direct alignment beam 20 through central hole 19 of scraper mirror 18, introducing it into the obscured region of high power beam 10. This results in alignment beam 20 propagating coaxial with high-power beam 10 along the optical train of the laser system. To maintain the initial, relative alignment between the two coaxial beams, HeNe laser 22 is fixedly mounted to the optical bench supporting resonator cavity 12. Thus, alignment beam 20 serves as a reference beam for high power, main laser beam 10. The established relative alignment permits angular deviations in the pointing of main laser beam 10 to be inferred from angular deviations detected in coaxial reference beam 20.

In a preferred embodiment, HeNe laser 22 may be any commercially available, high-quality helium/neon laser. While other light sources can be used to provide the alignment beam, the helium/neon laser provides a light beam of suitable coherence and collimation at a relatively low cost. Typically, the commercially available helium/neon lasers will have beam widths on the order of one millimeter. To improve alignment beam pointing stability, it may be desirable to interpose alignment beam expander optics between HeNe laser 22 and scraper mirror 18 to expand alignment beam 20 to a beam width just narrow enough to propagate through central hole 19 in the scraper mirror. In addition, to further provide alignment beam stability, it may be advisable to enclose HeNe laser 22 in a temperature controlled environment.

The optical relays encompassed by the autoalignment system according to the present invention include a turning mirror 24 and an extraction mirror 30. As noted above, the description of the preferred embodiment does not encompass the various optical relays commonly utilized in high power laser applications but not essential to the operation of the instant autoalignment system. However, for reasons of correction-induced beam translation, discussed below, turning mirror 24 and extraction mirror 30 should be located at the downstream end of the optical train of the high power laser (here represented only by resonator cavity 12).

After exiting unstable resonator cavity 12, main beam 10 and its coaxial reference beam 20 traverse a path incident to turning mirror 24. This turning mirror is a gimballed two-axis flat mirror, tiltable about an axis 25 and an axis perpendicular to the plane of the schematic view in FIG. 1. Main beam 10 and its coaxial reference beam 20 reflect from turning mirror 24 in a path incident to extraction mirror 30. Extraction mirror 30, located at the output end of the main laser optical train, functions to separate reference beam 20 from main beam 10, pointing the main, highpower beam in the preferred output direction and extracting the reference alignment beam in accordance with the present invention.

Figure 2:
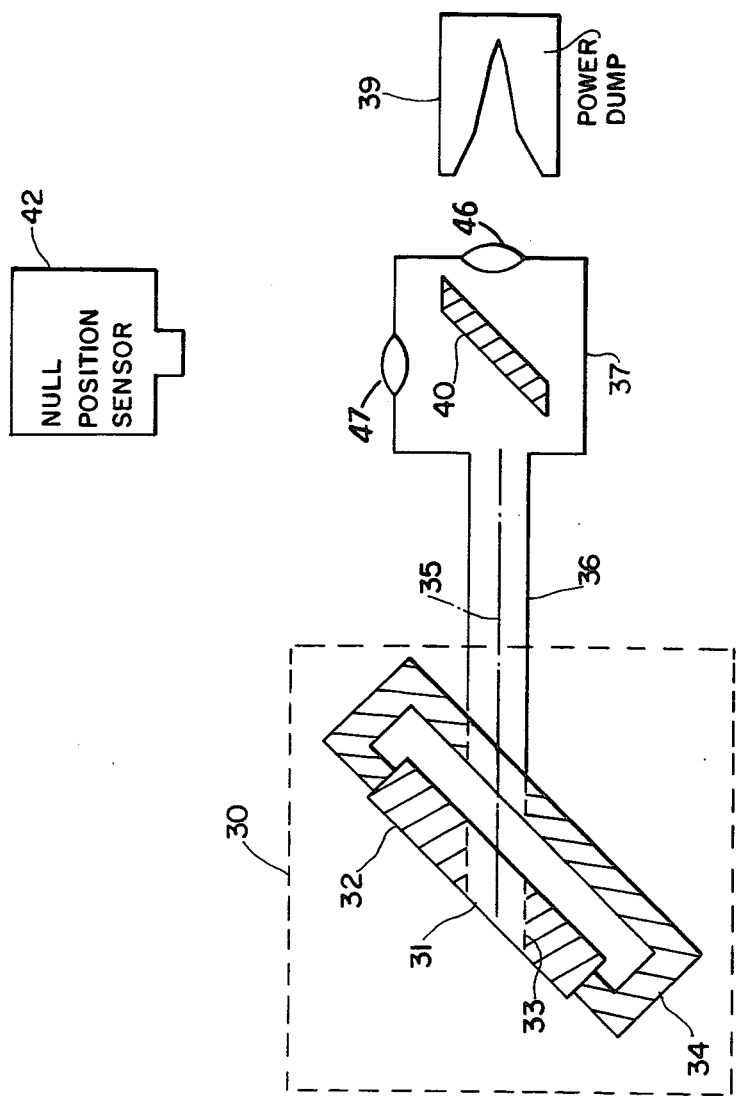
FIG. 2 is side schematic view of the alignment beam extraction mirror and angle sensing optics according to the present invention.

Extraction mirror 30 is shown in greater detail in FIG. 2. The optical elements of the extraction mirror comprise a flat mirror 32 with a central hole 31 in its reflective surface and a dichroic beam splitter 40 having its reflective surface parallel to the reflective surface of flat mirror 32. Mirror 32 is fixedly mounted to a mirror mount 34 and dichroic beam splitter 40 is attached to a support structure 37. Support structure 37 is fixedly attached to mirror mount 34 by means of a cylindrical conduit 36. The optical coupling of the optical elements of extraction mirror 30 is as follows. A cylindrical passageway 33 extends through mirror 32, obliquely intersecting the reflective surface of the mirror in central hole 31. As will be discussed below, cylindrical passageway 33 has a diameter approximately equal to but slightly less than that of the obscured central region of main laser beam 10 and is coaxial therewith. This passageway is extended from the back surface of mirror 32 to support structure 37 by means of cylindrical conduit 36. Conduit 36 is by design coaxial with passageway 33 and of approximately equal diameter. Thus, cylindrical passageway 33 and cylindrical conduit 36 define a continuous optical channel 35 between the reflective surface of mirror 32 and dichroic beam splitter 40. Focusing lenses 46 and 47 may be provided between dichroic beam splitter 40 and power dump 39, and between dichroic beam splitter 40 and null angle sensor 42.

The extraction of coaxial reference beam 20 from the high power laser train is accomplished as follows. Extraction mirror 30 is secured to its optical bench (not shown) by means of mirror mount 34. The extraction mirror is positioned in the optical path of main laser beam 10 and its coaxial reference beam 20 with mirror 32 oriented to reflect main beam 10 in the preferred output direction. The oblique angle of intersection between optical channel 35 and the reflective surface of mirror 32 is such that the axis of the optical channel is colinear with the optical axis of the high power laser train, i.e., colinear with the axis of propagation for main laser beam 10 and its coaxial reference beam 20. As mentioned above, the diameter of optical channel 35 is slightly less than the diameter of the obscured region of main beam 10. Correspondingly, the diameter of optical channel 35 is larger than the diameter of reference beam 20. Thus, extraction mirror 30 functions to reflect, by means of mirror 32, impinging main laser beam 10 in the preferred output direction and to extract, by means of central hole 31 and optical channel 35, impinging reference alignment beam 20. The reflection of main laser beam 10 is substantially total; however, some radiation spillover attributable to Fresnel diffraction does enter optical channel 35. Reference beam 20, together with this diffracted radiation, propagates through central hole 31, along optical channel 35, and impinges upon dichroic beam splitter 40. Dichroic beam splitter 40 is chosen to be transmissive to radiation of the wavelength of the main laser beam but to be totally reflective to radiation of the wavelength of the reference alignment beam. Thus, the diffracted radiation is transmitted by dichroic beamsplitter 40 to be absorbed by a power dump 39 while reference beam 20 is totally reflected in a path parallel to, but displaced from, main laser beam 10. To safely withstand the spillover power, dichroic beam splitter 40 should be one of the high quality dichroic reflectors currently available.

The autoalignment system according to the present invention performs its task of aligning highpower main laser beam 10 by monitoring the angularity of reference beam 20. As noted previously, reference beam 20 is prealigned with main laser beam 10, establishing relative pointing stability. Introduced into the obscured region of main beam 10, reference beam 20 propagates coaxially therewith, through all of the relay optics of the high power laser train. By this technique, all of the possible structural contributors of misalignment are included in the alignment path. And, by reason of the initial directional alignment of reference beam 20 with respect to the coaxial main laser beam 10, misalignments incurred in propagating through the various optical relays of the laser train will be manifested equally in each of the coaxial beams. When extracted from the laser train at the output end, reference beam 20 will, thus, still be in relative alignment with respect to main laser beam 10. This relative directional correspondence between main beam 10 and its coaxial reference beam 20 enables the angularity of the main beam to be inferred from the angularity of the reference beam. In other words, directional deviations in main laser beam 10 can be inferred from directional deviations detected in reference beam 20.

Maintaining pointing stability for main laser beam 10 by monitoring reference beam 20 entails detecting any angular deviation in the reference beam, translating any detected deviations into signals for implementing corrective, corrective servo-tilt adjustments to gimballed turning mirror 24 and tilting the turning mirror in response to these instructions. After being extracted from the high power laser train by means of extraction mirror 30, reference beam 20 reflects from dichroic beam splitter 40, through focusing lens 47, to impinge upon a null angle sensor 42. Null angle sensor 42 generates two coordinate error signals which correspond to the displacement of the impinging reference beam 20 with respect to an established null position. The error signals are transmitted to a servo electronics device 44. Servo electronics device 44, discussed more fully below, functions to translate these inputted error signals, indicative of the magnitude and orientation of angular displacements in reference beam 20, into corrective servo-tilt adjustment signals. The tilt adjustment signals are transmitted to a tilting mechanism 26 coupled to gimballed two-axis turning mirror 24. Tilting mechanism 26 implements the tilt adjustment signals, effecting precise, compensating tilt adjustments in the orientations of the gimballed turning mirror with respect to both degrees of tilt.

Servo electronic device 44 embodies a system-alignment algorithm, deriving, from the two-coordinate error signals indicative of structural misalignments, the two-degree, servo-tilt adjustment signals which, when implemented, effectively correct for the misalignments in the high power laser train. Thus, the essential function of servo electronics device 44 is to compute the simultaneous solutions to a matrix of 2 × 2 simultaneous equations. By way of illustration, these 2 × 2 simultaneous system equations may be written:

$$S_x = a_{21} T_1 + a_{12} T_2$$

$$S_y = a_{21} T_1 + a_{22} T_2$$

where $(S_x, S_y)$ represent the two-coordinate error signals from null angle sensor 42; $(T_1, T_2)$ represent the two degree servo-tilt adjustment signals which are to be derived by operation of servo electronics device 44; and $a_{11}, a_{12}, a_{21}$ and $a_{22}$ represent system constants corresponding to the optical and structural design parameters of the high power laser apparatus including the autoalignment system according to the present invention.

Although the function of servo electronics device 44 can be performed analogrithmically, in a preferred embodiment this function is performed by a digital microprocessor together with interfacing electronics between the microprocessor and null angle sensor 42 and between the microprocessor and tilting device 26. The microprocessor essentially functions to derive the servo-tilt adjustment solutions to the 2 × 2 simultaneous alignment equations. The interfacing electronics between the microprocessor and null positon sensor 42 include one or more analog-to-digital converters. As will be discussed below, the interfacing electronics between the microprocessor and the tilting device 26 depend upon whether the tilting device operates digitally or in an analog manner.

The tilt adjustments to gimballed turning mirror 24, derived from detected deviations in reference beam 20 by servo electronics device 44 and implemented by tilting mechanism 26, alter the reflected direction of reference beam 20 and, consequently, of coaxial main laser beam 10. These directional alterations operate to correct the alignment of reference beam 20, nulling any directional deviation. And, by reason of the relative directional alignment of main laser beam 10 and its coaxial reference beam 20, the tilt adjustments to turning mirror 24 will also effectuate the pointing alignment of the main high-power laser beam.

In a preferred embodiment, null angle sensor 42 can be any two-orthogonal-axis detector capable of generating a two-coordinate error signal correlated to the displacement of an impinging beam from an established null position. For example, any of the higher quality commercially available distributed or segmented quadcells or silicon detector cells may be employed as null angle sensors.

In a preferred embodiment, servo electronics device 44 can utilize any commercially available, general purpose microprocessor, such as the IMP-16 manufactured by National Semiconductor, together with appropriate software.

In a preferred embodiment tilting mechanism 26 can be commercially available piezoelectric, hydraulic or stepper motor drivers, subject to the constraint that two degrees of tilt actuation are required. If the piezoelectric or hydraulic drivers are used, the interface electronics described above will have to include one or more digital-to-analog converters. Stepper motor drivers operate digitally (i.e., in steps) and, thus, only digital interfacing would be required.

It will be noted that, since only a single turning mirror is employed to correct for directional deviations in main laser beam 10 and its coaxial reference beam 20, a certain degree of correction induced translation of the two coaxial beams will be manifested. To minimize this correction-induced beam translation, turning mirror 24 is located at the downstream end of the optical train. In addition, the angular deviations to be corrected will in themselves be small, on the order of micro-radians.

From the above description of the preferred embodiment, it is apparent that there is disclosed a system for automatically aligning a high power laser apparatus. The autoalignment system utilizes a HeNe laser to propagate an alignment beam coaxial with the main highpower laser beam, through all of the relay optics of the high power laser train. The reference beam is extracted from the laser train at the output end and its angularity is monitored. Directional deviations in the main laser beam can be inferred from directional deviations detected in the reference beam, allowing corrective alignment adjustments to be made.

Obviously, other embodiments and modifications of the present invention will readily come to those of ordinary skill in the art having the benefit of the teachings presented in the foregoing description and the drawings. It is, therefore, to be understood that this invention is not to be limited thereto and that said modifications and embodiments are intended to be included within the scope of the appended claims.

What is claimed and desired to be secured by Letters Patent of the United States is:

1. In a high power laser apparatus including an unstable resonator cavity having a scraper-type mirror, with a central hole therein, for generating an annular high power laser beam, an autoalignment system comprising:
    a source of radiation positioned to couple a reference beam through the central hole in said scraper mirror such that said reference beam is co-axial and aligned with said high power beam;
    an extraction mirror having a passageway extending therethrough intersecting the reflective surface of said extraction mirror, said passageway having a diameter slightly less than the diameter of an obscured central portion of said high power laser beam;
    a turning mirror positioned with respect to said scraper mirror and said extraction mirror to reflect said co-axial beams on a path incident to said extraction mirror and aligned with the axis of said passageway, such that said high power beam is reflected from the reflective surface of said extraction mirror and said reference beam is propagated through said passageway;
    detecting means, aligned with the optical path through said passageway, for generating an alignment error signal corresponding to the degree of deflection of said reference beam from an established reference point;
    tilting means coupled to said turning mirror for implementing tilt adjustments thereto;
    control means, coupled between said tilting means and said detecting means, responsive to said alignment error signals for applying correlated tilt signals to said tilting means such that corresponding tilt adjustments are made to the orientation of said turning mirror to maintain the alignment of said high power beam.

2. The autoalignment system of claim 1, wherein:
    said high power beam and said reference beam are of different frequencies; and,
    there is further provided a dichroic beam splitter in the optical path between said passageway and said detecting means;
    such that said reference beam is reflected to impinge upon said detecting means and spill-over radiation from said high power beam is transmitted through said dichroic mirror.

3. The autoalignment system of claim 2 wherein there is further provided a power dump positioned to receive said spill over radiation.

4. The autoalignment system of claim 3 wherein said source of radiation comprises a helium-neon laser.

5. The autoalignment system of claim 4 wherein said detecting means comprises a distributed quad cell.

6. The autoalignment system of claim 4 wherein said detecting means comprises a segmented quad cell.

7. The autoalignment system of claim 4 wherein said detecting means comprises a silicon detector cell.

8. The autoalignment system of claim 5, wherein said tilting means comprises a stepper motor.

9. The autoalignment system of claim 4, wherein said tilting means comprises a piezoelectric driver.

10. The autoalignment system of claim 4, wherein said interface circuitry is analogue and wherein said tilting means comprises a hydraulic driver.

11. The autoalignment system of claim 6, wherein said interface circuitry is analogue and wherein said tilting means comprises a hydraulic driver.

12. The autoalignment system of claim 7, wherein said interface circuitry is analogue and wherein said tilting means comprises a hydraulic driver.

13. In a high power laser apparatus including an unstable resonator cavity having a scraper type mirror, with a central hole therein, for generating an annular high power laser beam, a system for monitoring the alignment of said high power beam comprising:
    a. a source of radiation positioned to couple a reference beam through the central hole in said scraper mirror such that said reference beam is co-axial and aligned with said high power beam;
    b. an extraction mirror having a passageway extending therethrough intersecting the reflective surface of said extraction mirror, said passageway having a diameter slightly less than the diameter of an obscured central portion of said high power laser beam;
    c. a turning mirror positioned with respect to said scraper mirror and said extraction mirror to reflect said co-axial beams on a path incident to said extraction mirror and aligned with the axis of said passageway, such that said high power beam is reflected from the reflective surface of said extraction mirror and said reference beam is propagated through said passageway;
    d. detecting means, aligned with the axial optical path through said passageway, for generating an alignment error signal corresponding to the degree of deflection of said reference beam from an established reference point;
    e. said alignment error signal being also correlated to the degree of deflection of said co-axial high power beam.

14. The alignment monitoring system of claim 13 wherein:
    a. said high power beam and said reference beam are of different frequencies; and,
    b. there is further provided a dichroic beam splitter in the optical path between said passageway and said detecting means such that said reference beam is reflected to impinge upon said detecting means and spillover radiation from said high power beam is transmitted through said dichroic beam splitter.

15. The alignment monitoring system of claim 14 wherein there is further provided a power dump positioned to receive said spillover radiation.

16. The autoalignment system of claim 15 wherein said source of radiation comprises a helium/neon laser.

17. The autoalignment system of claim 16 wherein said detecting means comprises a distributed quad cell.

18. The autoalignment system of claim 16 wherein said detecting means comprises a segmented quad cell.

* * * * *